United States Patent Office 3,763,201
Patented Oct. 2, 1973

3,763,201
PRODUCTION OF ARSANILIC ACID
Hermann Hoffmann, 106 Kelly St., and Harry E. Green, 802 Kellogg St., both of Charles City, Iowa
No Drawing. Continuation-in-part of application Ser. No. 152,393, June 11, 1971. This application Oct. 12, 1971, Ser. No. 188,548
Int. Cl. C07f 9/74
U.S. Cl. 260—442   16 Claims

ABSTRACT OF THE DISCLOSURE

A process for increasing the arsanilic acid yield from the reaction of aniline and arsenic acid. The primary reaction is carried out under conventional conditions, and the normally discarded by-products of the primary reaction are hydrolyzed with acids at elevated temperatures, either in the crude primary reaction product mixture or after separation therefrom, to produce additional arsanilic acid. Di-(p-aminophenyl)-arsinic acid and tri-(p-aminophenyl)-arsineoxide are identified as two of the by-product compounds which are hydrolyzed. The arsanilic acid produced from the primary reaction and from the hydrolysis of by-products is recovered in a conventional manner.

CROSS REFERENCE TO RELATED APPLICATION

This is a continuation-in-part of applicants' copending application entitled Process of Producing Arsanilic Acid, Ser. No. 152,393, filed June 11, 1971.

BACKGROUND OF THE INVENTION

Para-aminophenyl-arsonic acid is a chemical which is used in veterinary medicine for the control of protozoan infections and the stimulation of growth, and also serves as an important intermediate in the preparation of numerous drugs such as carbarsone and tryparsamide. This chemical is commonly called arsanilic acid. As used herein, arsanilic acid is to be taken as meaning the para isomer. The ortho isomer of the acid is known, but it does not have the same properties as the para acid and is not important to this invention, although it is formed to a slight extent in some cases. Arsanilic acid as used herein refers to the compound:

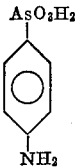

Arsanilic acid is commercially produced by the reaction of aniline and arsenic acid according to the following equation:

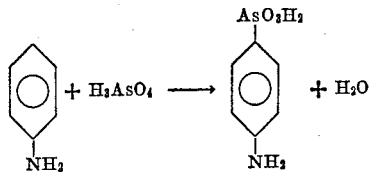

One commercial version of this reaction is known as the Abbott process, described in U.S. Pat. No. 2,677,696, and another version is known as the Squibb process, described in U.S. Pat. No. 2,245,572. These processes have been used for many years, and are subject to the disadvantage inherent in the condensation reaction of aniline and arsenic acid in that tarry by-product materials invariably form during the reaction and have to be separated from the reaction mixture prior to recovery of the desired arsanilic acid. The yields obtainable from these processes range from as low as 11 percent up to about 38 percent based on arsenic acid. These low yields, to a major extent, may be attributed to the fact that part of the starting material is transformed to tarry material, one component of which is di-(p-aminophenyl)-arsinic acid. Di-(p-aminophenyl)-arsinic acid has the formula:

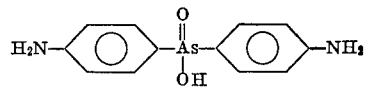

Recently, a process was described in U.S. Pat. No. 3,586,708 which obtains yields of 45% and higher based on arsenic acid. The process described therein provides for hydrolyzing di-(p-aminophenyl)arsinic acid, which results from the primary reaction, in the presence of acid at an elevated temperature. That process involves performing the primary reaction in the presence of a solvent, and requires that by-product material, including tri-(p-aminophenyl)-arsineoxide, be removed prior to the hydrolysis.

The tri-(p-aminophenyl)-arsineoxide which is treated as an undesirable by-product in the 3,586,708 process is a major component of the tarry material, and has the formula:

Even after identification of the above two compounds in the tarry by-product material, other compounds as yet unidentified have been shown to be present by chromatographic work. The structure and physiological properties of these unknown components are not known, so they complicate the waste disposal problem inherent in present commercial processes of producing arsanilic acid.

In all of the known processes of producing arsanilic acid by reaction of aniline with arsenic acid, the problem of formation of tarry by-products exists, and prior to this invention there has been no successful method available for recovering the aniline and arsenic acid contained in both the di and tri p-aminophenyl compounds in the tarry by-products, or of producing arsanilic acid from these by-products themselves. It can be seen that the above-identified compounds, which constitute a major part of the by-products, appear to be formed by further condensation and water production from the desired primary reaction products and excess aniline which is present in the primary reaction mixture. The unknown by-product components may comprise some complex related compounds.

In any event, it has now been found that all of the by-products, including both the known and the unknown components thereof, can be hydrolyzed at specific conditions to produce aniline and arsanilic acid, thereby greatly increasing the ultimate yield of arsanilic acid based on starting amounts of arsenic acid, as well as recovering aniline from the previously discarded by-products for later reuse.

Another recent process of producing arsanilic acid is described in U.S. Pat. No. 3,296,290. In that process, aniline and arsenic acid are reacted at slightly lower than normal temperatures, such as from 140° to 150° C., at reduced pressures. This process also describes a method of recovering much of the unreacted aniline during the process, but has no provision for reprocessing or otherwise treating the by-products of the reaction.

SUMMARY OF THE INVENTION

This invention relates to an improved process for production of arsanilic acid by reaction of aniline and arsenic acid, and more particularly to a process wherein the by-products formed during the primary reaction are hydrolyzed with acid at elevated temperatures to produce additional arsanilic acid therefrom.

According to this invention, the by-products formed in the reaction of aniline and arsenic acid, comprising predominantly di-(p-aminophenyl)-arsinic acid and tri-(p-aminophenyl)-arsineoxide as well as smaller amounts of unknown material, are hydrolyzed to aniline and arsanilic acid by treatment with acids at elevated temperatures. The hydrolysis may be carried out with any suitable acid. Aqueous mineral acids, and particularly hydrochloric and sulfuric, are preferred, largely for economic reasons. Organic acids, such as benzenesulfonic acid, are also suitable.

The hydrolysis temperature may range from about 70° C. to 105° C., and the amount of acid preferably is from about 0.8 to about 2.8 equivalents of acid per equivalent of aniline or aniline derivative present in the material to be hydrolyzed. The duration of the hydrolysis reaction is dependent upon several considerations, including the reaction temperature, the amount of acid present, and the type of acid used. Also, the time may depend upon the degree of hydrolysis desired. For example, the hydrolysis can be carried to completion, or it may be stopped prior to completion, and the unhydrolyzed by-products separated and recycled to a later or separate hydrolysis. In any event, the reaction is rather slow, and several hours are required to obtain substantial hydrolysis of the by-product materials. In some cases, particularly when the temperature is toward the lower end of the range recited above, the hydroysis may require several days.

The by-products which are treated according to this invention are obtained by reacting aniline and arsenic acid in a conventional way at a temperature of from about 150° C. to 185° C. at atmospheric pressure, or at slightly lower temperatures such as from 140° C. to 170° C. under reduced pressure. During the primary reaction, which may take place in the presence of an organic solvent such as chlorobenzene, water formed by the condensation reaction as well as water contained in the arsenic acid used is removed by distillation. The organic phase is generally refluxed back into the reaction mixture during this time.

The reaction mixture, which contains arsanilic acid, by-products, and unreacted starting materials, is cooled, and arsanilic acid formed during the primary reaction can be recovered in a conventional manner, followed by separate hydrolysis of the by-product materials for recovery of additional arsanilic acid, or the crude reaction mixture may be hydrolyzed prior to any separation to produce additional arsanilic acid from by-product materials contained in the crude reaction mixture.

In the case where the by-products are to be treated separately, the removal may be effected in the following manner:

A sodium hydroxide solution is added to the reaction mixture and excess aniline and any organic solvent present are distilled off. The remaining mixture of reaction products is cooled to about room temperature and filtered. The material filtered out at this point will be predominantly tri-(p-aminophenyl)-arsineoxide, particularly when the mixture is at a slightly basic pH, such as about 8.5 to 9.0. The tri-(p-aminophenyl)-arsineoxide is not soluble at these conditions, and is easily filtered out. The filtrate may then be brought to a pH of about 5 by addition of acid, and a second filtration carried out which will remove additional by-products, predominantly consisting of di-(p-aminophenyl)-arsinic acid. A small amount of additional by-products may be filtered out as slightly lower pH such as above 4.5. It is apparent that the plural filtration steps could be combined into a single filtration at a suitable pH if desired, but the described procedure provides for obtaining the by-product materials as more or less separate components thereof. The arsanilic acid is then recovered from the filtrate in a conventional manner, such as by crystallization from a pH of about 3 or slightly higher. The arsanilic acid filtrate can then be combined with the by-products previously filtered out, and the resultant material can then be hydrolyzed with acid at an elevated temperature according to this invention to produce additional arsanilic acid and to recover aniline contained in the by-product materials. The aniline and arsanilic acid can be isolated and recovered from the hydrolyzed material in a manner similar to that described for the primary reaction mixture.

The hydrolysis of the primary reaction by-products can also be performed prior to any separation of arsanilic acid. In such a case, the crude primary reaction product including by-products is cooled to about 100° C., and the acid for carrying out the hydrolysis is added. The mixture is then maintained at a temperature sufficiently high for the hydrolysis to occur for a period of time sufficient to hydrolyze the by-products, either partially or substantially completely, prior to recovery of arsanilic acid from the hydrolyzed reaction products in a conventional manner.

DESCRIPTION OF THE PREFERRED EMBODIMENTS

Preferred embodiments of the invention will be described by reference to the following exemplary examples of various aspects of this invention. While the examples illustrate preferred conditions, it will be clear that many modifications and variations could be made within the scope of the invention, such as by varying the kind of amount of acid used in the hydrolysis, the temperature or time of the hydrolysis, or the sequence of processing steps utilized to obtain the improved results of this invention, which in its broadest sense encompasses a method of improving the yield of arsanilic acid from the reaction of aniline and arsenic acid by hydrolyzing the reaction by-product materials including tri-(p-aminophenyl)-arsineoxide with an acid at an elevated temperature for a sufficient time to produce substantial amounts of arsanilic acid from the by-product materials.

Example 1

This example illustrates the process according to the invention wherein the by-product materials are separated from the crude primary reaction mixture prior to recovery of any arsanilic acid. The by-product material is treated separately to produce additional arsanilic acid therefrom.

342 grams (2 moles) of 83% arsenic acid were added during 75 minutes to a rapidly stirred mixture of 372.5 grams (4 moles) aniline and 111 grams chlorobenzene while the temperature of the mixture was kept between 147° C. and 150° C. After the addition of arsenic acid was complete the mixture was stirred for an additional 8 hours while being maintained at 149° to 153° C. Water was continuously removed by distillation, and the organic phase of the distillate was continuously recycled back into the reaction mixture. At the end of that time a total of 121 grams of water, comprising water formed by the condensation of aniline and arsenic acid and water present in the arsenic acid starting material, has been removed. The mixture was then allowed to cool to 110° C. and 562 grams (2.81 moles) of 20% sodium hydroxide were added over a two hour period while water, chlorobenzene and excess aniline were distilled off at a temperature of from 102° C. to 113° C. The distillation was continued for an additional two hours while the volume of the mixture was kept at about 700 ml. by the addition of water.

The mixture was then diluted with water to a volume of 1400 ml. and allowed to cool to 23° C. At this point, 52 grams of by-product material, which was predominantly tri-(p-aminophenyl)-arsineoxide, were filtered out. The pH of the filtrate was then brought from 8.7 to 5.1 by the addition of 1.8 moles of hydrochloric acid while the volume of the mixture was increased to 2,200 ml. by the addition of water. The mixture was stirred for 5 hours at room temperature and again filtered. 108 grams of by-product material comprising predominantly di-(p-aminophenyl)-arsinic acid was filtered off at this point. The pH of the filtrate was lowered to 4.5 by the addition of 0.2 mole of hydrochloric acid, and an additional 5 grams of by-products, the composition of which was not determined, was filtered off.

The filtrate was then brought to a pH of 3.2 by addition of 0.6 mole of hydrochloric acid, and 128 grams (29.5% based upon arsenic acid) of arsanilic acid were recovered as a precipitate.

The arsanilic acid filtrate, which was saturated with arsanilic acid, was combined with the by-products filtered off during each of the three filtration steps. 2.8 moles of hydrochloric acid were added to the combined arsanilic acid filtrate and by-products, and the mixture was heated at 80° C. for 5 days. During this period of heating in the presence of the hydrochloric acid, the by-products were hydrolyzed to aniline and arsanilic acid, and the aniline was then recovered from the hydrolyzed reaction mixture in the manner described for recovery of aniline from the primary reaction mixture. Arsanilic acid was then precipitated from the remaining hydrolyzed mixture in the manner described for the primary reaction product, and an additional 120 grams (27.5% based on arsenic acid) were recovered. The filtrate contained 14 grams (3.2%) of arsanilic acid which could be recovered at least partially in subsequent processing.

Thus it can be seen from this example that an arsanilic acid yield of 59% was obtained, compared to yields of less than 50% which are described in the literature, due to the additional arsanilic acid produced and recovered from the by-products which are discarded in present commercial processes for making arsanilic acid. Due primarily to arsanilic acid produced from the tri form of by-product, the yield is also significantly higher than those reported in the U.S. Pat. 3,586,708.

Example 2

This example illustrates a process according to this invention wherein the by-product materials from the reaction of aniline and arsenic acid are hydrolyzed as a part of the crude primary reaction mixture, rather than separately as was described in Example 1. In this example, by-products isolated from a previous run are also added to the crude primary reaction mixture for recovery of arsanilic acid therefrom.

369 grams (2.0 moles) of 77% arsenic acid were added over a one hour period to a rapidly stirred mixture of 373 grams (4.0 moles) aniline and 111 grams chlorobenzene at a temperature of 155° C. while water was continuously removed by distillation and the organic phase of the distillate was recycled back into the reaction mixture. The mixture was then stirred for an additional 6 hours at a temperature of 155° C., and at the end of this time 155 grams of water had been removed. 93 grams of aniline were added rapidly and the mixture was allowed to cool down to 100° C. 592 grams (6.0 moles) of 37% hydrochloric acid were added within 15 minutes at a temperature of 80–100° C. 38 grams of di-(p-aminophenyl)-arsinic acid isolated from a previous run were then added to the reaction mixture, and the mixture was stirred at 80° C. for 41 hours. 2.7 liters of water and 400 grams sodium hydroxide were then added and chlorobenzene and aniline were distilled off as in Example 1. The remaining solution, having a volume of 2.4 liters and a pH of 8.2, was essentially free of solid by-product material, indicating that practically all of the tri-p-aminophenyl)-arsineoxide had been hydrolyzed. After clarification in the presence of 10 grams of decolorizing carbon, the pH of the solution was then brought to 5.5 by the addition of 220 grams of 37% hydrochloric acid. This mixture was stirred for several hours at room temperature, and then 39 grams of essentially di-(p-aminophenyl) arsinic acid were filtered off. The solution was again clarified at pH 5.0. 150 grams of 37% hydrochloric acid were then added to bring the pH to 3.0 and to precipitate out arsanilic acid. 252 grams of arsanilic acid (58% based on arsenic acid) were recovered as a precipitate.

The above example illustrates that by-products of the primary reaction can be hydrolyzed to aniline and arsanilic acid prior to separation from the primary reaction mixture. The overall yield or arsanilic acid according to this embodiment is again much higher than the yields reported in the literature and currently obtainable in commercial processes for producing arsanilic acid. Also, it shows the di-(p-aminophenyl)-arsinic acid by-product which is filtered off during the process can be recycled into a subsequent primary reaction mixture so that essentially all of the by-product materials can be recovered and reprocessed for production of arsanilic acid.

Example 3

369 grams of 77% arsenic acid and 373 grams of aniline were reacted as described in Example 2. 592 grams of 37% hydrochloric acid and 22 grams of di-(p-aminophenyl)-arsinic acid isolated from a previous batch were then added to the mixture, which was maintained at 88° C. for 21 hours.

The hydrolyzed mixture was then worked up as described in Example 2, and 227 grams (50.3%) of arsanilic acid and 38 grams of di-(p-aminophenyl)-arsinic acid were recovered.

Tihs example illustrates that the hydrolysis proceeds somewhat more rapidly at a higher temperature. For example, Example 2 was reacted at 80° C. for 41 hours, whereas in this example the hydrolysis was at 88° C. for 21 hours, although the yield was somewhat lower in this example.

Example 4

169 grams of 83.9% arsenic acid were added over 20 minutes to 466 grams of aniline at a temperature of 144–147° C. at a pressure of 380 to 400 mm. of mercury. The mixture was then maintained at 155–158° C. and 310–420 mm. of mercury for 7 hours, and at the end of this period 65 ml. of water had been removed by distillation as in the previous examples. The mixture was allowed to cool down to 90° C., and 690 grams of 37% hydrochloric acid were added and the temperature maintained at 80° C. for 35 hours. The workup was carried out as described in Example 2, and 37 grams of by-product, predominantly di-(p-aminophenyl)-arsinic acid, and 118 grams (54.3%) of arsanilic acid were recovered.

This example illustrates that high yields of arsanilic acid are obtained when the primary reaction of aniline and arsenic acid is carried out at reduced pressure.

Example 5

The procedure described in Example 4 was repeated, except 37 grams of di-(p-aminophenyl)-arsinic acid were added prior to the hydrolysis, which took place at 75° C. over a period of 65 hours. The hydrolyzed products were worked up as described in the previous examples, and 129 grams of arsanilic acid were recovered.

Example 6

169 grams of 83.9% arsenic acid were reacted with 466 grams of aniline as described in Example 4. 506 grams of 97% sulfuric acid in 1650 ml. of water were added to the primary reaction mixture and then heated at 80° C. for 75 hours. The hydrolyzed reaction products were worked up as described in the previous examples. 97 grams (44.7%) of arsanilic acid and 31 grams of di-(p-aminophenyl)-arsinic acid were recovered. The filtrate contained an additional 20 grams of arsanilic acid.

This example illustrates the hydrolysis of the primary reaction by-products, prior to separation, by heating with sulfuric acid. It is apparent that the 31 grams of by-product obtained in this example could be returned to a subsequent hydrolysis step, or hydrolyzed separately, to recover additional arsanilic acid and improve the overall yield in accordance with the invention.

Example 7

677 grams of 83.9% arsenic acid were added to a stirred solution of 931 grams aniline and 100 grams chlorobenzene at a temperature of 150°-160° C. During the addition and a subsequent 8 hour reaction, at 153°–157° C., the organic phase of the distillate was returned to the reaction flask and the aqueous phase removed. The crude primary reaction mixture was cooled to 90° C., and 1623 grams of 27% hydrochloric acid were added at 90°-80° C. The resulting mixture was heated at 80° C. for 39.5 hours, and after dilution with 2500 grams of ice and water, made alkaline by the addition of 1600 grams of 50% sodium hydroxide. Chlorobenzene and excess aniline were then removed by distillation at constant volume. After cooling, 13 grams of insolubles were filtered out. The filtrate was worked up as described in the previous examples, and 75.5 grams of di-(p-aminophenyl)-arsinic acid and 493 grams of arsanilic acid were recovered. These two fractions account for 63.3% of the arsenic acid used in the starting material.

The above examples illustrate that by-products including tri-(p-aminophenyl)-arsineoxide resulting from the reaction of arsenic acid with aniline, which according to present technology have been discarded in every case, can be hydrolyzed with acid at elevated temperatures to produce aniline and arsanilic acid therefrom. The by-products can be hydrolyzed after separation from the primary reaction products, or the crude primary reaction mixture including by-products can be hydrolyzed according to the invention. Small amounts of di-(p-aminophenyl)-arsinic acid are recovered in the workup of the reaction products of this invention, but this material can be recycled to a subsequent hydrolysis reaction so that it is not lost and need not be discarded. Also, it is apparent that the di-(p-aminophenyl)-arsinic acid could be collected and hydrolyzed separately to increase the overall yield of arsanilic acid based on the amount of arsenic acid in the starting material.

It has also been shown that this invention is applicable to the by-products formed by reaction of aniline and arsenic acid at reduced pressure. The hydrolysis reaction proceeds according to many variables, including temperature, amount of acid, and type of acid. The degree of hydrolysis is also obviously a function of the time of hydrolysis, and can be carried to a desired degree of completion with unhydrolyzed by-products then being separately recovered and recycled to the process of subsequent hydrolysis.

The yields obtained according to this invention have been shown to be much higher than yields reported in the literature or obtained in known commercial processes for production of arsanilic acid.

The disposal problem encountered with tarry by-products is essentially eliminated, as the entire amount of by-products, including some unknown components, can be hydrolyzed to aniline and arsanilic acid according to this invention. The small amount of by-products obtained in working up the hydrolyzed material can be treated in a subsequent hydrolysis, so that the disposal problem which burdens existing commercial processes in these times of great concern over ecological matters is effectively solved.

This invention allows for flexibility of processing in that the individual components of the by-product material may be separately recovered for subsequent processing, either alone or with other materials.

We claim:

1. A process of producing arsanilic acid from by products, including tri-(p-aminophenyl)arsineoxide, formed in the reaction of aniline with arsenic acid comprising:
   hydrolyzing said tri-(p-aminophenyl)-arsineoxide with acid at an elevated temperature for a period of time sufficient to produce a substantial amount of arsanilic acid; and
   recovering said arsanilic acid.

2. The process of claim 1 wherein the crude reaction mixture of aniline with arsenic acid, containing the reaction by-products, is treated.

3. The process of claim 1 wherein the by-products have been separated from the crude reaction mixture prior to treatment.

4. The process of claim 1 wherein the by-products are hydrolyzed with an aqueous mineral acid.

5. The process of claim 4 wherein the aqueous mineral acid is hydrochloric acid.

6. The process of claim 1 wherein the hydrolysis temperature is from about 70° C. to about 105° C.

7. The process of claim 6 wherein about 0.8 to 2.8 equivalents of acid are used per equivalent of aniline or aniline derivative present in the material to be hydrolyzed.

8. The process of claim 7 wherein the hydrolysis is continued for at least five hours.

9. A process of producing arsanilic acid comprising:
   reacting arsenic acid and aniline at a temperature of from 140° C. to 185° C.;
   removing water from the reaction mixture during the reaction;
   allowing the reaction mixture to cool to about 100° C.;
   adding acid to the cooled reaction mixture and maintaining the acidized reaction mixture above about 70° C. for a time sufficient to hydrolyze by products including tri-(p-aminophenyl)-arsineoxide formed during the reaction of arsenic acid and aniline; and
   recovering arsanilic acid.

10. The process of claim 9 wherein the acid added to the cooled reaction mixture is an aqueous mineral acid and the reaction is carried out in the presence of an organic solvent.

11. The process of claim 10 wherein sodium hydroxide solution is added to the hydrolyzed reaction mixture;
   the organic solvent and free aniline are removed by distillation;
   the remaining solution is clarified at a pH of about 5; and
   the clarified solution is brought to a pH of about 3 to precipitate arsanilic acid therefrom.

12. The process of claim 10 wherein by-product material from a separate reaction of aniline and arsenic acid is added to the reaction mixture prior to hydrolysis thereof.

13. The process of claim 12 wherein the by-product material comprises di-(p-aminophenyl)arsinic acid.

14. The process of claim 12 wherein the by-product material comprises tri-(p-aminophenyl)-arsineoxide.

15. A process of producing arsanilic acid comprising:
   reacting aniline with arsenic acid at a temperature of from 140° C. to 185° C. in the presence of an organic solvent while removing water from the reaction mixture;
   allowing the reaction mixture to cool to about 110° C.;
   adding sodium hydroxide solution to make the reaction mixture basic to facilitate removal of organic solvent and free aniline therefrom;
   cooling the basic reaction mixture and removing by-product containing predominantly tri-(p-aminophenyl)-arsineoxide therefrom;
   lowering the pH of the reaction mixture to about 5 and removing additional by-product material containing predominantly di-(p-aminophenyl)-arsinic acid;
   further lowering the pH of the reaction mixture to precipitate arsanilic acid therefrom;

combining the filtrate and the previously recovered by-product materials including said tri-(p-aminophenyl)-arsineoxide and hydrolyzing the combined material at an elevated temperature in the presence of an aqueous mineral acid to produce additional arsanilic acid; and recovering arsanilic acid from the hydrolyzed combined material.

16. A process of producing arsanilic acid from tri-(p-aminophenyl)-arsineoxide comprising:

hydrolyzing said tri-(p-aminophenyl)-arsineoxide with an aqueous mineral acid at an elevated temperature for a period of time sufficient to produce a substantial amount of arsanilic acid; and recovering the arsanilic acid.

References Cited
UNITED STATES PATENTS 3,586,708   6/1971   Nemec _____ 260—442

WERTEN F. W. BELLAMY, Primary Examiner